May 20, 1969  H. M. BUSEY  3,444,693

WATER WAVE SUPPRESSION DEVICE

Filed Feb. 27, 1967  Sheet 1 of 2

INVENTOR.
HAROLD M. BUSEY
BY Robert O. Richardson
ATTORNEY

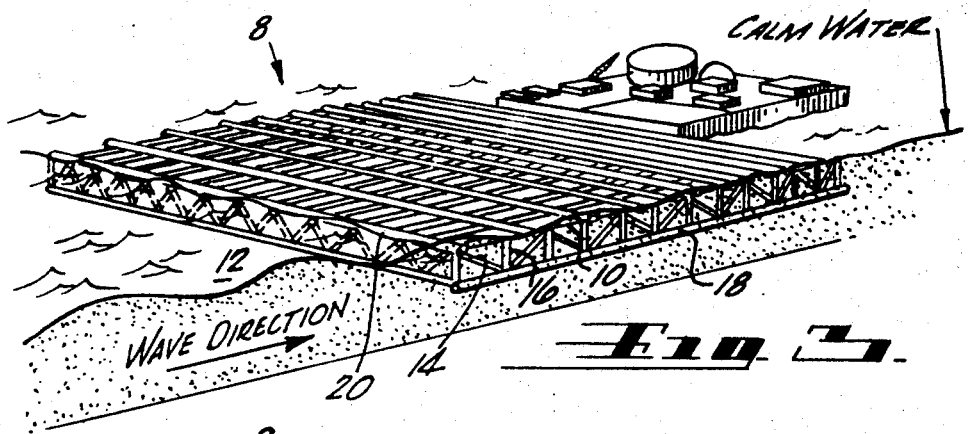
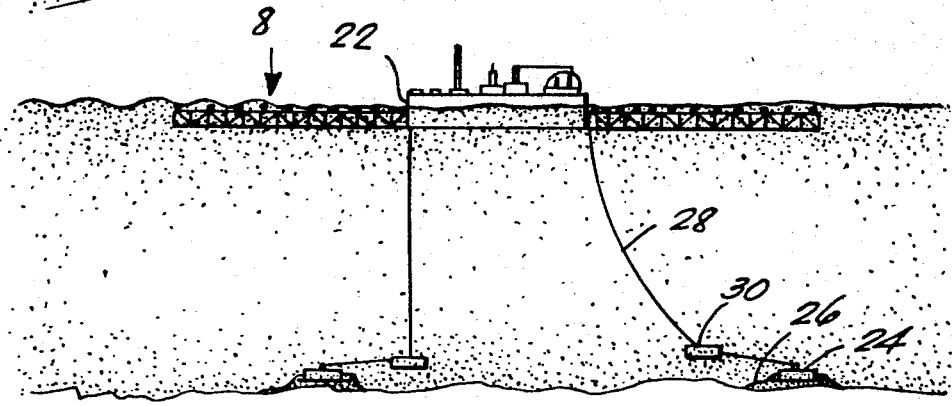
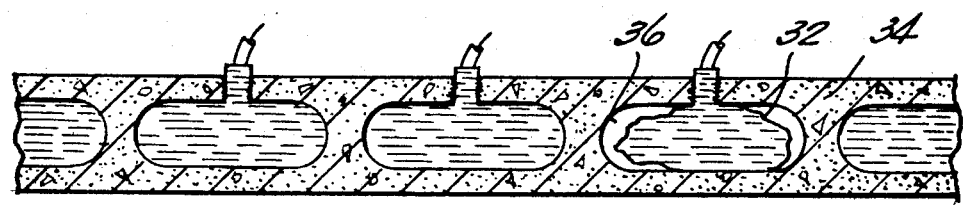
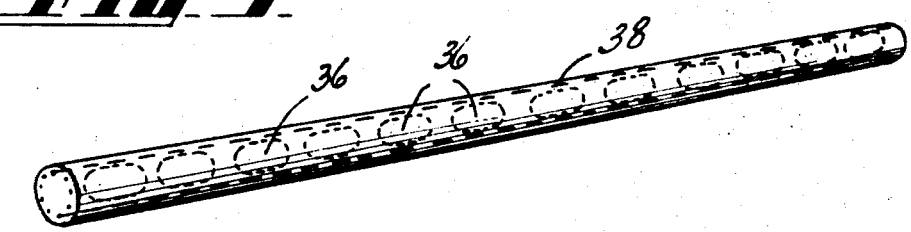

United States Patent Office 3,444,693
Patented May 20, 1969

3,444,693
WATER WAVE SUPPRESSION DEVICE
Harold M. Busey, Kennewick, Wash., assignor, by mesne assignments, to McDonnell Douglas Corporation, Santa Monica, Calif., a corporation of Maryland
Filed Feb. 27, 1967, Ser. No. 618,841
Int. Cl. E02b 3/04
U.S. Cl. 61—5       2 Claims

ABSTRACT OF THE DISCLOSURE

A horizontal structure of floating elements are attached to each other whereby the mechanical energy of water waves is converted to turbulence. Waves are progressively dampened as they travel through the structure.

Background of the invention

Great losses occur due to damage by water waves. A suppression of these waves would prevent this loss. When calm areas can be assured, these water areas can be useful for industrial, recreational, and even military sites. Breakwater barriers and structures have long been used in an effort to reduce this damage. In places where the water is shallow enough, barriers have been built from the bottom to the top of the water to serve as a suitable breakwater. Pilings to which vertically extending barriers have been attached have been placed around docks and piers to retard such wave motion. These barriers usually have some form of rigid vertical or inclined wall which frequently has cusps of some type to deflect the on-rushing water. Such structures are subjected to terrific pounding from storm waves and are only suitable on coasts and canals where good foundations are possible. Vertical walls serving as breakwaters which float, are subject to violent surges from the wave motion and are effective primarily on waves having a length which is an odd number multiple of two times the distance between the walls, so that the water forces will cancel. In random wave motion, such vertical walls are not efficient in dampening. As another form of wave barrier protective blankets of floatable material have been placed on the surface of the water in an effort to dampen out the wave motion. These blankets tend to conform to the shape of the waves and because of their yieldability, they must cover a greater area in order to have the same effectiveness as a rigid structure. A rigid blanket, however, is subjected to greater punishment and hence greater maintenance problems. In all of these cases, it has been the use of brute force against brute force and, while these breakwater barriers are massive in structure, time and punishment erodes and damages them.

Summary of the invention

The present invention is based upon the recognition that wave energy is shown by the apparent motion of a mound of surface water moving in the direction of flow of the wave energy, but that individual increments of water in the motion complex actually move in a vertical circle with little horizontal translation outside the wave amplitude. Any object rigidly held in the rolling water will exert a dampening influence to the motion and convert some of the mechanical energy of the wave in turbulence and ultimately heat of the water. To dampen the water waves, a structure is provided which is sufficiently strong to withstand the wave energy while disrupting the flow and converting the wave energy to turbulence. This dampening is done sequentially as a wave travels through the structure so that the full force of the wave is not exerted upon the first part of the structure encountered thereby. Floating prestressed concrete cylinders, forming a rigidly connected raft, may be used for this purpose.

Brief description of the drawings

FIG. 3 is a perspective view showing the water wave suppression device shielding an artificial island from wave turbulence;

FIG. 4 is a sectional view showing a barge and wave suppression device and their attachment to the ocean floor;

FIG. 5 is a sectional view illustrating one form of construction of a floating prestressed concrete cylinder; and FIG. 6 is a perspective view of a finished concrete cylinder.

Figure 1:
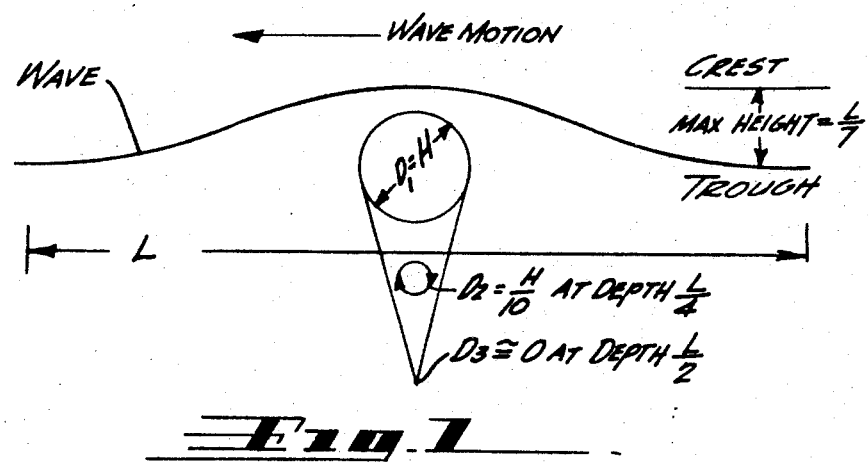
FIG. 1 is a schematic representation of water movement within a wave.

Reference is now made to FIG. 1. Here there is shown a wave having a length L from trough to trough. An increment of water will travel the height of the wave from its trough to its crest and this height will not exceed about $\frac{1}{7}$ that of the wave length, because a stronger wind force needed to generate a larger height will also shear off the top. It has been observed that an increment of water will move vertically this height and also have a circular motion so as to inscribe a circle. The circle has a diameter $D_1$ equal to the height of the wave when this increment of water is near the surface. At a depth of $\frac{1}{4}$ the wave length a smaller circle is generated by the increment of water. In this case, the circle has a diameter $D_2$ equal to the wave height divided by 10. At a depth of $\frac{1}{2}$ the wave length, the circle of movement has a diameter $D_3$ which approaches zero. In other words, at a depth of $\frac{1}{2}$ the wave length, the increment of water is practically motionless and does not have vertical or horizontal motion components.

Figure 2:
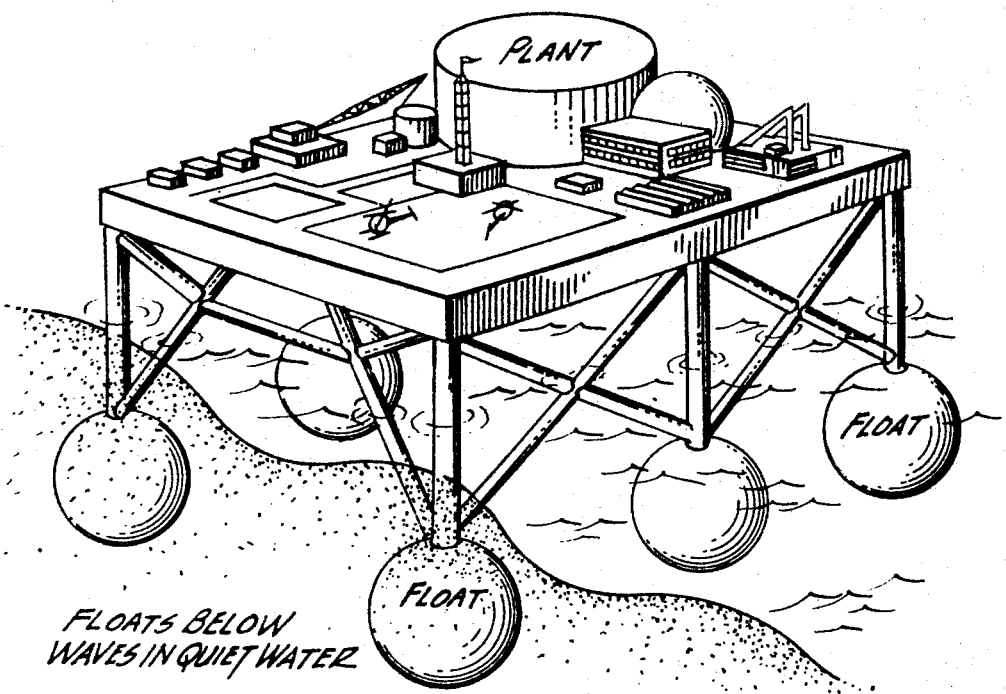
FIG. 2 is a perspective view of an artificial island supported on flotation cavities positioned below the motion of ocean waves.

From the foregoing, it will become apparent that in very deep water in which an artificial island cannot be physically attached to or built from the bottom, that the flotation structure should be positioned in the stable water far below the surface, with legs extending upwardly to a platform which rises above the wave crest. This principle is illustrated in FIG. 2 and indicates how the waves pass under the platform and continue on without being damped appreciably. Off shore, oil well platforms and radar bases are built on tall structures utilizing a form of placing the platform above the wave crests.

The present concept of a floating wave damping device is shown in FIG. 3. Here is shown a raft 8 with supports 10 near the water surface 12 that extend in the direction of the wave movement, and the diagonal and vertical innerconnections 14, 16 with the lower elements 18 are for reinforcing purposes and to hold the transverse extending wave suppression elements 20 at the water surface in fixed relative position. The horizontal elements 20 which extend transverse to the wave direction are held rigidly relative to each other by this supporting structure. These elements are spaced progressively closer together from the outer edge facing the wave motion inwardly in a direction toward the calm water area protected thereby. This spacing commences at the outer edge with the elements spaced approximately a wave height apart. The spacing of adjacent elements then decrease by about 8% of the preceding spacing. In this manner, the first elements of the structure do not absorb the full impact of the wave energy but only a portion as the water pours between these elements. With decreasing spaces toward the calm water area, the elements will dampen the wave as much as is desired. The entire raft should be in total length at least 1.5 to 2 wavelengths of the largest expected wave. In one installation twenty-four elements spaced in the above manner were found to be effective. Smaller waves and random motion turbulence is dampened even more effectively than the larger waves. For purposes of economy, the diameters of the elements may be made smaller toward the calm water zone.

Since the above-described wave suppression device provides calm water for the artificial island, the island may float on the surface of the water instead of being positioned vertically above the water. This artificial island might be a nuclear desalinization plant, a floating airport runway, a floating industrial plant, a residential area or bridge. The wave suppression device also may be used to protect a marina or artificial harbor. While the wave suppression device would naturally appear between the rough water and such area to be protected, it may also be desirable to completely surround the calm water area with such devices.

As shown in FIG. 4, one method of anchoring such an island 22 and wave suppression device 8 could be the use of large concrete barges 24 with skirts 26 which would be towed to the site and sunk. The skirts could then be covered by pumping sand over them to help hold the barges in place. The anchor cables 28 would also have a great weight 30 attached, so that wind forces on the raft 22 would elevate the weight 30 and exert a constant force to return the raft back to its intended position.

In case the artificial island and wave damping structure should start to sink, by positioning these constant tension weights 30 on the anchor cables 28 just above the bottom, a safety feature is added. When the weights reach the bottom, they would cease to pull on the artificial island and in effect remove some load. This gives an increased buoyancy to the structure to keep it floating until repairs can be made.

The final pad of wave suppression elements or individual floats may be towed to the permanent site and lashed to other elements as needed to enclose an area of calm water. Steel cable might be used for this lash-up with plastic coating applied for corrosion protection. For quick installation, such as for the protection of ships in distress, or on beaches during military landing operations, wave suppression devices may be made of rafts of canvas or plastic tubes which may be inflated quickly by filling with water. Wooden poles may also be lashed together. However, for large permanent structures, flotaing rafts are preferably used that are made of prestressed floatable concrete cylinders. They may be built of any lentgh desired, they should withstand corrosion and barnacle build-up of the marine environment, and provide the strength and mass that is desired.

These concrete cylinders may be built in large concrete tension beds on low ground near the ocean, with interior cables placed under tension while the concrete is poured into the forms to make the prestressed structure. Between the cables could be positioned plastic bags 32 inflated with water, as shown in FIG. 5. After the concrete 34 has hardened, these water bags may be removed to provide the proper air spaces for buoyancy. Upon removal, then, of course, the holes are plugged so that air will be trapped within the cavities 36. After this, the forming area may be flooded and the long concrete cylinders floated to the pad assembly area. Such a finished cylinder 38 is shown in FIG. 6, it being understood that the length may be as long as a thousand feet. Since the air cavities within the cylinder are spaced from each other, the damage of one cylinder and its filling with water will not cause the cylinder to sink. These cylinders may be used both as the floatation elements 18 that are positioned substantially below the ocean surface and they also may be used as the horizontally extending wave suppression elements 20.

Having thus described the exemplary form of this invention, it is to be understood that many variations and modifications will become at once obvious to one skilled in the art and it is to be understood that these deviations from the embodiment just described are to be considered part of the invention as defined by the appended claims.

What is claimed is:

1. A water wave suppression device for providing a calm water area comprising:

a rigid raft having floatation elements near the water surface;

said raft having wave suppression elements spaced apart and extending horizontally on the water surface and transversely of the direction of wave motion, said wave suppression elements being rigidly spaced from each other, thereby creating turbulence from wave energy as waves pass thereover, said raft being from 1½ to 2 wavelengths long with the windwardmost wave suppression elements being spaced approximately a wave height apart, the spacing between said wave suppression elements being progressively closer in the direction of the area in which calm water is desired.

2. A water wave suppression device as in claim 1, wherein said spacing decreases on the order of approximately 8% of the preceding spacing.

References Cited

UNITED STATES PATENTS

| | | | |
|---|---|---|---|
| 436,644 | 9/1890 | White | 61—5 |
| 1,432,530 | 10/1922 | Chance | 61—5 |
| 1,846,278 | 2/1932 | Roane | 61—5 |
| 2,658,350 | 11/1953 | Magill | 61—5 |
| 2,994,201 | 8/1961 | Hutchings | 61—5 |
| 3,276,209 | 10/1966 | Mosdell | 61—5 |
| 2,387,965 | 10/1945 | Wood | 61—4 |

EARL J. WITMER, *Primary Examiner.*